(No Model.)

W. P. BROWN.
HAND TRUCK.

No. 283,562. Patented Aug. 21, 1883.

WITNESSES:
Thos. Houghton.
Edw. W. Byrn.

INVENTOR:
Wm. P. Brown
BY Munn & Co
ATTORNEYS.

UNITED STATES PATENT OFFICE.

WILLIAM P. BROWN, OF ZANESVILLE, OHIO.

HAND-TRUCK.

SPECIFICATION forming part of Letters Patent No. 283,562, dated August 21, 1883.

Application filed February 3, 1883. (No model.)

*To all whom it may concern:*

Be it known that I, WILLIAM P. BROWN, of Zanesville, in the county of Muskingum and State of Ohio, have invented a new and useful Improvement in Hand-Trucks; and I do hereby declare that the following is a full, clear, and exact description of the same, reference being had to the accompanying drawings, forming part of this specification, in which—

Figure 1:
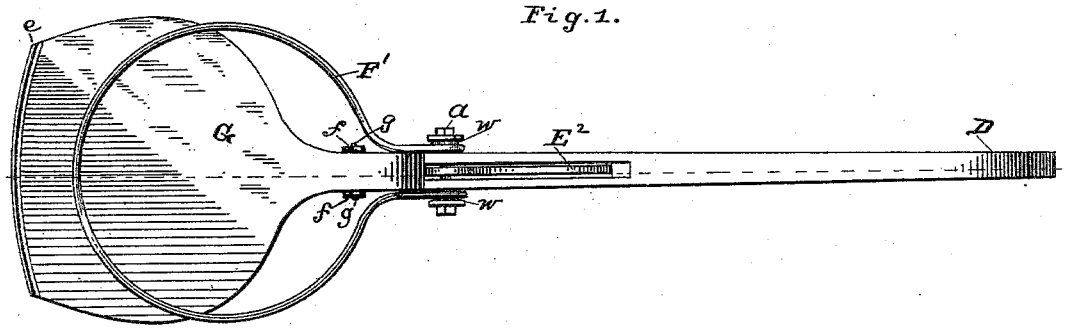
Figure 2:
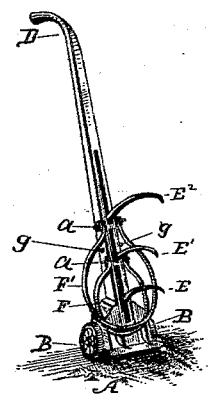
Figure 3:
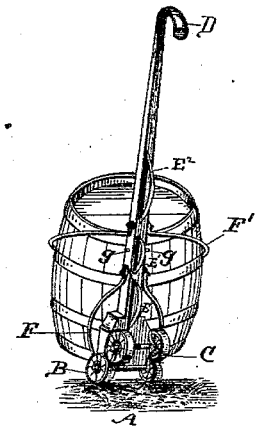
Figures 4, 5:
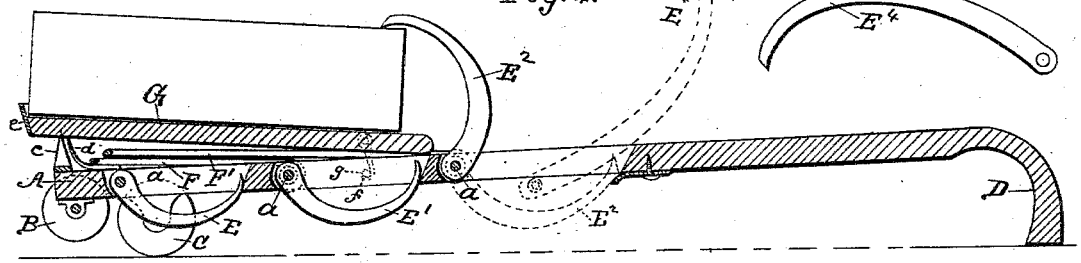
Figure 6:
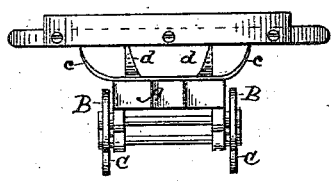

Figure 1 shows a plan view of the truck with the detachable platform applied thereto and the bail extended for grappling a bag. Fig. 2 is a perspective view, on a smaller scale, from the front, showing the truck with one pair of wheels and the platform removed. Fig. 3 is a perspective view, on the same scale as Fig. 2, from the rear, showing the truck with two pairs of wheels and carrying a barrel. Fig. 4 is a longitudinal section of the truck shown in Fig. 1, with the bail under the platform and a box grappled by one of the hook-dogs. Fig. 5 is a detail of the detachable hook-dog shown in dotted lines in Fig. 4, and Fig. 6 is a front view of the truck.

My invention relates to an improvement in hand-trucks designed to facilitate the transportation of boxes, barrels, sacks, and other large packages of merchandise.

The improvement consists in the peculiar construction and arrangement of a clutch hook or dog for tilting the articles onto the truck, in the peculiar combination therewith of a bail to be thrown over such articles as barrels, and in a removable platform, all as hereinafter fully described.

In the drawings, A represents the head-block of the truck, which is provided with a rear handle, D, and upon its under side has two sets of wheels, B and C, the front ones of which, B, are journaled a little higher than the rear ones, so that when the handle is inclined in the position of ordinary use the two sets of wheels will be both tangent to the floor, and the truck may, by raising and lowering the handle, be readily shifted from one set of wheels to the other. The advantage of this is that in passing over a sill or raised projection in the floor the truck may be run up to the projection on the hind wheels until the front wheels extend over said projection or sill, when by raising the handles the weight of the truck will be transferred to the front wheels, while the hind ones may be lifted over said sill or projection. For many uses this feature of a double set of wheels will be very desirable. I do not, however, limit my invention to a double set of wheels, as the other features of my invention have an independent value, and will be employed in connection with a single pair of wheels, as in Fig. 2. The rear handle, D, is a single straight bar fastened in the head-block of the truck and curved like a plow-handle at its rear end. The bent end serves as a foot or support to keep the truck about equal in height front and rear; but instead of the rear end being bent to support the handle, a block or foot may be fastened beneath the handle, in which case the main frame or handle may be of one straight piece of material. This handle is slotted in the center about half its length, or more, and in the slot is hung upon pivot-bolts $a$ one or more curved clutch hooks or dogs, E E' E². Each of said hooks is pivoted or jointed at its lower end on the pivot-bolts $a$, and when not in use has its tooth or free end toward the upper end of the handle, while its curved body portion drops in the slot beneath the handle, so that it is out of the way of boxes and packages when not required for use. This relative position of the hook to the main frame is such that when the handle is turned vertically to take a box or package the said hook falls of its own gravity down upon the article to be clutched, and when the article has been transported and the box is removed said hook then falls back by gravity into the slot to its out-of-the-way position.

In addition to the hooks or dogs bolted or pivoted in the slotted frame or handle, there may be used the extra hook or dog E³, Fig. 5, which remains detached only when required to catch such articles as large casks or packages, that require greater length than those for general use. This hook or dog, when in use, is inserted in the slotted handle at such point as best adapts it to catch the package. This hook or dog is held in position by a pin-bolt passed through a hole in the lower end directly beneath the main frame, as in dotted line E⁴, Fig. 4, in which case the lower end of the dog rests on the hook-dog, which lies in a hooked or curved position under it, and which supports this extra dog while the pin-bolt is being placed in the hole in its lower end. This dog E⁴ is easily removed when not needed by removing the pin-bolt which holds it in position when at work.

F F' are bails, of which there may be one or more, of different sizes, according to the variety of sizes of barrels, packages, or sacks, over which they are to be thrown to tilt the same onto the truck. These bails are for such articles as cannot be clutched by the hook, or which would be injured by the hook. Said bails are pivoted or hung upon the same pivot-bolt that holds the hook or dog, and by their being brought so close together at their point of pivot form almost a hoop or circle shape, with a V or Y shaped opening directly at its point of pivot, (see Fig. 1,) which tends to act as a center or point of attraction to the barrel or package, whereby the barrel is always drawn to rest on the center of handle. This obviates the necessity of any provision being made in the frame or handle to retain the barrel in a central position; also accommodates small barrels, as the shape of the bail near the handle rounds sharply to a crotch or fork like termination which admits almost any size circle less than a barrel. These bails also serve as a platform for packages when resting on the head-block, out of use for other purposes. The eye part of each bail works on a tube-washer, $w$. The eye of the bail surrounds this washer, while the bolt passes through the hole of the tube-washer. This tubular washer serves to hold the bail in shape, and prevents the bolt-head and nut from cramping the eye of the bail and prevents the bolt from turning.

At the lower end of the head-block of the truck are prongs or horns $c$ $c$ and $d$ $d$, arranged at different distances apart, to hold on to the packages under which they may be thrust in loading the packages onto the truck.

G is a detachable platform, having an upwardly-projecting ledge, $e$, and hooks $f f$, by which latter it may be fastened upon the handle D by engaging the hooks $f$ $f$ on the platform with the eyes $g$ $g$ on the handle D, while the perforated end or under side of the platform, at its front end, rests on the hooked or horned points $c$ $c$ and $d$ $d$. This serves to hold the platform in position while being used to sustain such merchandise as is contained in flexible sacks, bags, &c., which would be pierced and injured by the projections on the head-blocks.

I am aware of the fact that hand-trucks have been provided with pivoted hooks or dogs variously arranged, and that they have also been provided with a pivoted bail adapted to be thrown over barrels, &c.; and I do not claim these features, broadly. My construction and arrangement of the pivoted hook or dog is distinctive, in that it not only drops into action from gravity when the truck is vertical, and out of action from gravity when the truck is inclined toward the horizontal, and it rests when out of action entirely below the level of the frame or handle, and is thus entirely out of the way of boxes, &c., so that a series of hooks may be employed and the box still be allowed to rest flat against the frame or handle. Furthermore, the bail serves the double purpose of tilting barrels, &c., and also of acting as a platform, as in Fig. 2, when the detachable platform is not required.

Having thus described my invention, what I claim as new is—

1. The combination, in a hand-truck, of its handle formed of a single slotted bar, and a bent clutch-hook pivoted at its lower end in said slot, and means, substantially as shown, for engaging with the toothed or upper end of the hook to stop it and preserve its position beneath the handle, as set forth.

2. The combination, with a hand-truck, of a detachable platform, substantially as and for the purpose described.

3. The combination, with the handle of a hand-truck, of a bent clutch-hook pivoted to said handle, and a bail, serving both as a platform when the truck is in use, and as a means for holding barrels, as described.

4. The combination, with the handle of a hand-truck, of a pivoted hook and pivoted bail both secured to the truck by the same pivotal bolt, as shown and described.

5. The combination, with a hand-truck, of a set of pivoted bails of different sizes, and a set of bent hooks or dogs pivoted at their lower ends to the handle, and resting when out of use beneath the handle, as shown and described, and for the purpose set forth.

WILLIAM P. BROWN.

Witnesses:
F. A. SEBORN,
J. T. STORY.